(12) United States Patent
Kataoka et al.

(10) Patent No.: US 12,466,158 B2
(45) Date of Patent: Nov. 11, 2025

(54) DECORATIVE SHEET

(71) Applicant: Dai Nippon Printing Co., Ltd., Tokyo (JP)

(72) Inventors: Sakie Kataoka, Tokyo (JP); Yoshiyuki Meiki, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 38 days.

(21) Appl. No.: 18/695,385

(22) PCT Filed: Sep. 8, 2022

(86) PCT No.: PCT/JP2022/033702
§ 371 (c)(1),
(2) Date: Oct. 15, 2024

(87) PCT Pub. No.: WO2023/053890
PCT Pub. Date: Apr. 6, 2023

(65) Prior Publication Data
US 2025/0042125 A1    Feb. 6, 2025

(30) Foreign Application Priority Data

Oct. 1, 2021   (JP) .................................. 2021-162741
Oct. 1, 2021   (JP) .................................. 2021-162742

(51) Int. Cl.
  *B32B 3/10*      (2006.01)
  *B32B 3/30*      (2006.01)
  (Continued)

(52) U.S. Cl.
  CPC .................. *B32B 3/30* (2013.01); *B32B 7/12* (2013.01); *B32B 27/08* (2013.01);
  (Continued)

(58) Field of Classification Search
  None
  See application file for complete search history.

(56) References Cited

U.S. PATENT DOCUMENTS

| 7,931,954 B2 | 4/2011 | Kobayashi et al. |
| 10,306,790 B2 | 5/2019 | Abe et al. |

(Continued)

FOREIGN PATENT DOCUMENTS

| EP | 0673308 B1 | 11/2000 |
| JP | H08118578 A | * 5/1996 |

(Continued)

OTHER PUBLICATIONS

English Translation of International Search Report mailed Nov. 22, 2022, issued for PCT/JP2022/033702.

(Continued)

*Primary Examiner* — Christopher M Polley
(74) *Attorney, Agent, or Firm* — Troutman Pepper Locke LLP

(57) ABSTRACT

Provided is a decorative sheet provided with excellent three-dimensional effect by an internal protruding and recessed shape even after molding. A decorative sheet comprising a transparent resin film layer having a protruding and recessed shape on one surface thereof, and a decorative layer formed along the protruding and recessed shape of the transparent resin film layer, wherein the protruding and recessed shape is provided with a plurality of protrusions protruding toward the decorative layer from the transparent resin film layer side, and the plurality of protrusions are each formed in a stepwise shape.

18 Claims, 4 Drawing Sheets

(51) Int. Cl.
 *B32B 7/12* (2006.01)
 *B32B 27/08* (2006.01)
(52) U.S. Cl.
 CPC ..... *B32B 2250/24* (2013.01); *B32B 2307/412* (2013.01); *B32B 2451/00* (2013.01)

(56) References Cited

U.S. PATENT DOCUMENTS

| 2003/0067527 | A1* | 4/2003 | Temple ................ B41M 7/0081 347/101 |
|---|---|---|---|
| 2016/0101589 | A1 | 4/2016 | Ozawa et al. |
| 2017/0217123 | A1 | 8/2017 | Kataoka et al. |
| 2021/0138827 | A1 | 5/2021 | Miyazaki et al. |
| 2023/0382156 | A1 | 11/2023 | Miyazaki et al. |

FOREIGN PATENT DOCUMENTS

| JP | 2004042351 A | * | 2/2004 |
|---|---|---|---|
| JP | 2005059330 A | * | 3/2005 |
| JP | 2010-082912 A | | 4/2010 |
| JP | 2016-078236 A | | 5/2016 |
| WO | 2016/052629 A1 | | 4/2016 |
| WO | 2019/189806 A1 | | 10/2019 |
| WO | 2022/071441 A1 | | 4/2022 |

OTHER PUBLICATIONS

Supplementary European Search Report dated Jul. 25, 2025, issued for Counterpart European Patent Application No. 22875762.1.

* cited by examiner

DECORATIVE SHEET

TECHNICAL FIELD

The present disclosure relates to a decorative sheet and a decorative resin molded article in which the decorative sheet is used.

BACKGROUND ART

Decorative resin molded articles obtained by laminating a decorative sheet on the surface of a resin molded article have been heretofore used for vehicle interior and exterior parts, building interior materials, home electric appliance housings and the like. In manufacturing of such a decorative resin molded article, a molding method or the like is used in which a decorative sheet provided with a design in advance is integrated with a resin by injection molding. Typical examples of the molding method include an insert molding method in which a decorative sheet is molded into a three-dimensional shape by a vacuum molding die in advance, the decorative sheet is inserted into an injection molding die, and a fluidized resin is injected into the die to integrate the resin with the decorative sheet; and an injection molding simultaneous decorating method in which a decorative sheet inserted into a mold during injection molding is integrated with a molten resin injected into a cavity by injection molding.

For example, there is a decorative sheet with a three-dimensional shape created inside the decorative sheet by providing a printing layer on the back surface of an acrylic film located on the front surface of the decorative sheet and forming an uneven shape on the printing layer side. In such a decorative sheet, fine lines and shadows of an uneven shape present a reality feeling and a high-grade feeling as opposed to presentation of pictures merely by printing.

In recent years, designs for decorative sheets have become diversified, and it has been required to present a stereoscopic feeling with greater diversity.

In addition, there is a problem that depending on heat and pressure during injection molding or preceding premolding (vacuum molding) in, for example, a method for insert molding of a decorative sheet, an uneven shape formed inside the decorative sheet becomes gentler or smaller in size, so that a high realistic design feeling from the uneven shape is compromised.

In recent years, designs for decorative sheets are required to not only present a reality feeling by simulating natural objects and natural things such as real carbon and hairlines, but also present a more advanced stereoscopic feeling such that an artificial geometric pattern or a stratification feeling is presented.

PRIOR ART DOCUMENT

Patent Document

Patent Document 1: Japanese Patent Laid-open Publication No. 2010-82912

SUMMARY OF THE INVENTION

Problems to be Solved by the Invention

A main object of a first embodiment of the present disclosure is to provide a decorative sheet having an excellent stereoscopic feeling from an internal uneven shape even after molding. Another object of the first embodiment of the present disclosure is to provide a decorative resin molded article in which the decorative sheet is used.

A main object of a second embodiment of the present disclosure is to provide a decorative sheet having an excellent stereoscopic feeling from an internal uneven shape. Another object of the second embodiment of the present disclosure is to provide a decorative resin molded article in which the decorative sheet is used.

Means for Solving the Problem

The inventors of the present disclosure have extensively conducted studies for solving the above-described problems. As a result, the inventors of the present disclosure have found that a decorative sheet including a transparent resin film layer having an uneven shape on one surface thereof, and a decorative layer formed along the uneven shape of the transparent resin film layer, in which the uneven shape includes a plurality of convex portions having different heights and protruding from the transparent resin film layer side to the decorative layer side and the plurality of convex portions are each formed in a stepwise shape, exhibits an excellent stereoscopic feeling from the uneven shape inside the decorative sheet even after molding. The first embodiment of the present disclosure has been completed by further conducting studies on the basis of the above-mentioned findings.

That is, the first embodiment of the present disclosure provides an invention having the following features.

Item 1A. A decorative sheet including
 a transparent resin film layer having an uneven shape on one surface thereof, and
 a decorative layer formed along the uneven shape of the transparent resin film layer,
 in which the uneven shape includes a plurality of convex portions protruding from the transparent resin film layer side to the decorative layer side, and
 the plurality of convex portions are each formed in a stepwise shape.

Item 2A. The decorative sheet according to item 1A, further including a support film layer on the decorative layer side.

Item 3A. The decorative sheet according to item 2A, in which the support film layer is formed so as to fill concave portions on the decorative layer side.

Item 4A. The decorative sheet according to item 2A or 3A, further including an adhesive layer between the decorative layer and the support film layer.

Item 5A. The decorative sheet according to any one of items 1A to 4A, in which a surface of the transparent resin film layer on a side opposite to the decorative layer is smooth.

Item 6A. A decorative resin molded article including
 a transparent resin film layer having an uneven shape on one surface thereof,
 a decorative layer formed along the uneven shape of the transparent resin film layer, and
 a molded resin layer,
 in which the uneven shape includes a plurality of convex portions protruding from the transparent resin film layer side to the decorative layer side, and
 the plurality of convex portions are each formed in a stepwise shape.

The inventors of the present disclosure have extensively conducted studies for solving the above-described problems. As a result, the inventors of the present disclosure have found that a decorative sheet including a transparent resin film layer having an uneven shape on one surface thereof, and a decorative layer formed along the uneven shape of the transparent resin film layer, in which the uneven shape includes a plurality of convex portions having different heights and protruding from the transparent resin film layer side to the decorative layer side and a ratio of the height h (μm) to the width w (μm) (h/w) in each of the plurality of convex portions is set to 100% or less, exhibits an excellent stereoscopic feeling from the uneven shape inside the decorative sheet even after molding. The second embodiment of the present disclosure has been completed by further conducting studies on the basis of the above-mentioned findings.

That is, the second embodiment of the present disclosure provides an invention having the following features.

Item 1B. A decorative sheet including
   a transparent resin film layer having an uneven shape on one surface thereof, and
   a decorative layer formed along the uneven shape of the transparent resin film layer,
   in which the uneven shape includes a plurality of convex portions having different heights and protruding from the transparent resin film layer side to the decorative layer side, and
   a ratio of the height h (μm) to the width w (μm) (h/w) in each of the plurality of convex portions is 100% or less.

Item 2B. The decorative sheet according to item 1B, further including a support film layer on the decorative layer side.

Item 3B. The decorative sheet according to item 2B, in which the support film layer is formed so as to fill concave portions on the decorative layer side.

Item 4B. The decorative sheet according to item 2B or 3B, further including an adhesive layer between the decorative layer and the support film layer.

Item 5B. The decorative sheet according to any one of items 1B to 4B, in which a surface of the transparent resin film layer on a side opposite to the decorative layer is smooth.

Item 6B. A decorative resin molded article including
   a transparent resin film layer having an uneven shape on one surface thereof,
   a decorative layer formed along the uneven shape of the transparent resin film layer, and
   a molded resin layer
   in which the uneven shape includes a plurality of convex portions having different heights and protruding from the transparent resin film layer side to the decorative layer side, and
   a ratio of the height h (μm) to the width w (μm) (h/w) in each of the plurality of convex portions is 100% or less.

Advantages of the Invention

According to the first embodiment of the present disclosure, it is possible to provide a decorative sheet having an excellent stereoscopic feeling from an internal uneven shape even after molding. In addition, according to the first embodiment of the present disclosure, it is possible to provide a decorative resin molded article in which the decorative sheet is used.

In addition, according to the second embodiment of the present disclosure, it is possible to provide a decorative sheet having an excellent stereoscopic feeling from an internal uneven shape. In addition, according to the second embodiment of the present disclosure, it is possible to provide a decorative resin molded article in which the decorative sheet is used.

EMBODIMENTS OF THE INVENTION

1. Decorative Sheet

A decorative sheet according to the first embodiment of the present disclosure includes a transparent resin film layer having an uneven shape on one surface thereof, and a decorative layer formed along the uneven shape of the transparent resin film layer, in which the uneven shape includes a plurality of convex portions protruding from the transparent resin film layer side to the decorative layer side, and the plurality of convex portions are each formed in a stepwise shape. Since the decorative sheet of the present disclosure has the above-mentioned structure, the decorative sheet exhibits an excellent stereoscopic feeling from an internal uneven shape even after molding.

A decorative sheet according to the second embodiment of the present disclosure includes a transparent resin film layer having an uneven shape on one surface thereof, and a decorative layer formed along the uneven shape of the transparent resin film layer, in which the uneven shape includes a plurality of convex portions having different heights and protruding from the transparent resin film layer side to the decorative layer side, and a ratio of the height h (μm) to the width w (μm) (h/w) in each of the plurality of convex portions is 100% or less. Since the decorative sheet of the present disclosure has the above-mentioned structure, the decorative sheet exhibits an excellent stereoscopic feeling from an internal uneven shape.

Hereinafter, the decorative sheet of the present disclosure will be described in detail. In the following description, matters specific to the first or second embodiments of the present disclosure will be specified as matters related to the first or second embodiments, and matters common to the first and second embodiments will be described as matters related to the present disclosure without being clearly indicated.

Laminated Structure of Decorative Sheet

Figure 1:
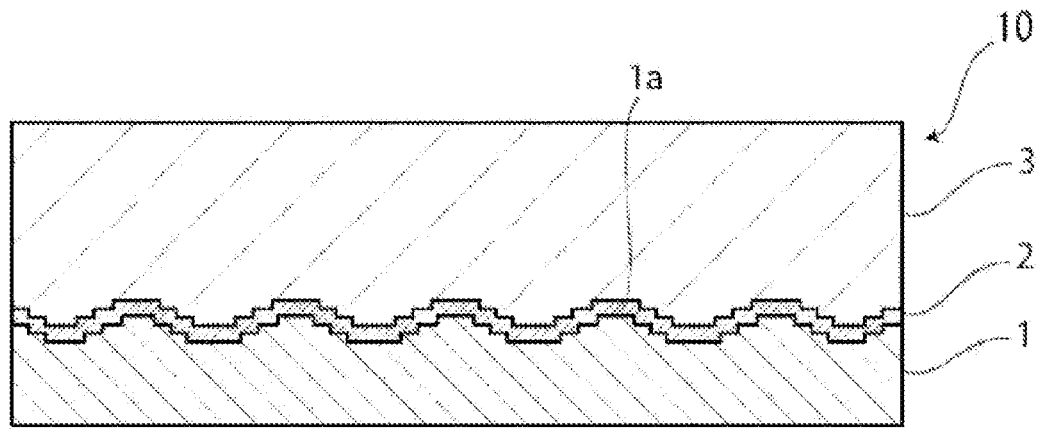
FIG. 1 is a schematic view of a cross-section structure of one form of a decorative sheet according to the first embodiment of the present disclosure.

As shown in FIG. 1, a decorative sheet 10 according to the first embodiment of the present disclosure includes at least a transparent resin film layer 1 and a decorative layer 2. The transparent resin film layer 1 has an uneven shape on one surface thereof. The decorative layer 2 is formed along the uneven shape of the transparent resin film layer 1. That is, a surface of the decorative layer 2 on a side opposite to the transparent resin film layer 1 has an uneven shape. Note that a surface of the transparent resin film layer 1 on a side opposite to a surface having the uneven shape is preferably smooth.

If necessary, the decorative sheet 10 according to the first embodiment of the present disclosure may include a support film layer 3 on the decorative layer 2 side for the purpose of, for example, improving shape retainability. The support film layer 3 may be formed so as to fill concave portions of the uneven shape on the decorative layer 2 side. Note that all the concave portions may be filled with the support film layer 3, or a part of the concave portions may be filled with the support film layer 3, with a gap existing between the support film layer 3 and the uneven shape on the decorative layer 2 side.

In the decorative sheet 10 according to the first embodiment of the present disclosure, an adhesive layer 4 may be provided between the decorative layer 2 and the support film layer 3 if necessary. If necessary, an adhesive layer may be provided on a surface of the support film layer 3 on a side opposite to the decorative layer 2 (not shown).

Figure 3:
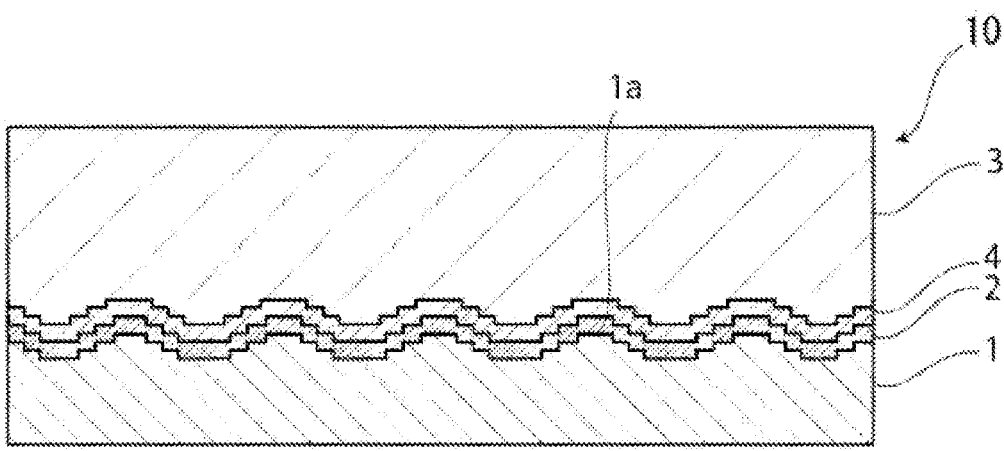
FIG. 3 is a schematic view of a cross-section structure of one form of the decorative sheet according to the first embodiment of the present disclosure.

Examples of the laminated structure of the decorative sheet according to the first embodiment of the present disclosure include a laminated structure in which a transparent resin film layer and a decorative layer are laminated in this order; a laminated structure in which a transparent resin film layer, a decorative layer and a support film layer are laminated in this order; a laminated structure in which a transparent resin film layer, a decorative layer, an adhesive layer and a support film layer are laminated in this order; and a laminated structure in which a transparent resin film layer, a decorative layer, an adhesive layer, a support film layer and an adhesive layer are laminated in this order. As an aspect of the laminated structure of the decorative sheet according to the first embodiment of the present disclosure, a schematic view of a cross-sectional structure of one form of a decorative sheet in which a transparent resin film layer, a decorative layer and a support film layer are laminated is shown in FIG. 1. As an aspect of the laminated structure of the decorative sheet according to the first embodiment of the present disclosure, a schematic view of a cross-sectional structure of one form of a decorative sheet in which a transparent resin film layer, a decorative layer, an adhesive layer and a support film layer are laminated in this order is shown in FIG. 3.

Figure 6:
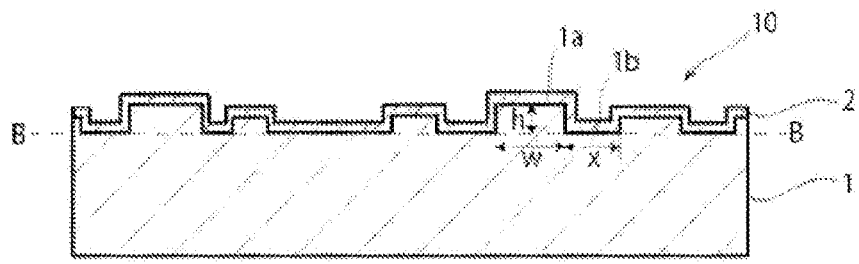
FIG. 6 is a schematic view of a cross-section structure of one form of the decorative sheet according to the second embodiment of the present disclosure.

As shown in FIG. 6, a decorative sheet 10 according to the second embodiment of the present disclosure includes at least a transparent resin film layer 1 and a decorative layer 2. The transparent resin film layer 1 has an uneven shape on one surface thereof. The decorative layer 2 is formed along the uneven shape of the transparent resin film layer 1. That is, a surface of the decorative layer 2 on a side opposite to the transparent resin film layer 1 has an uneven shape. Note that a surface of the transparent resin film layer 1 on a side opposite to a surface having the uneven shape is preferably smooth.

If necessary, the decorative sheet 10 according to the second embodiment of the present disclosure may include a support film layer 3 on the decorative layer 2 side for the purpose of, for example, improving shape retainability. The support film layer 3 may be formed so as to fill concave portions of the uneven shape on the decorative layer 2 side. Note that all the concave portions may be filled with the support film layer 3, or a part of the concave portions may be filled with the support film layer 3, with a gap existing between the support film layer 3 and the uneven shape on the decorative layer 2 side.

In the decorative sheet 10 according to the second embodiment of the present disclosure, an adhesive layer 4 may be provided between the decorative layer 2 and the support film layer 3 if necessary. If necessary, an adhesive layer may be provided on a surface of the support film layer 3 on a side opposite to the decorative layer 2 (not shown).

Figure 7:
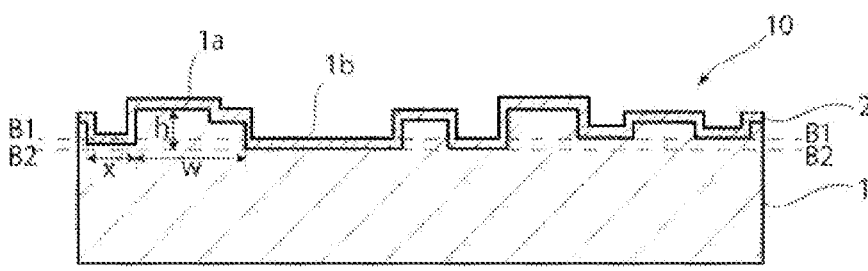
FIG. 7 is a schematic view of a cross-section structure of one form of the decorative sheet according to the second embodiment of the present disclosure.
Figure 8:
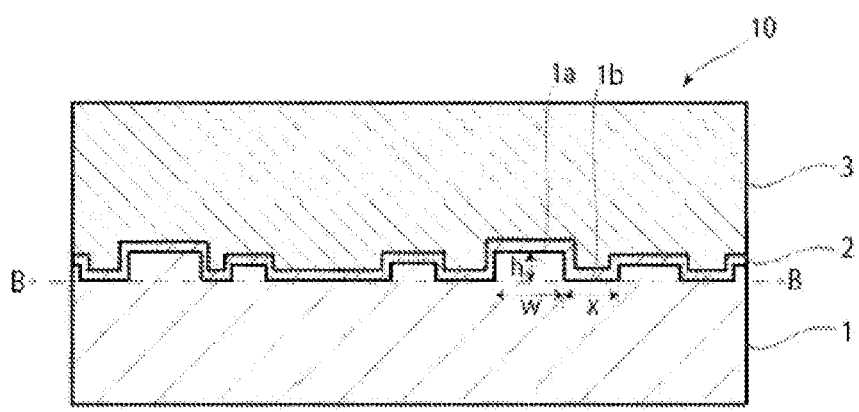
FIG. 8 is a schematic view of a cross-section structure of one form of the decorative sheet according to the second embodiment of the present disclosure.
Figure 9:
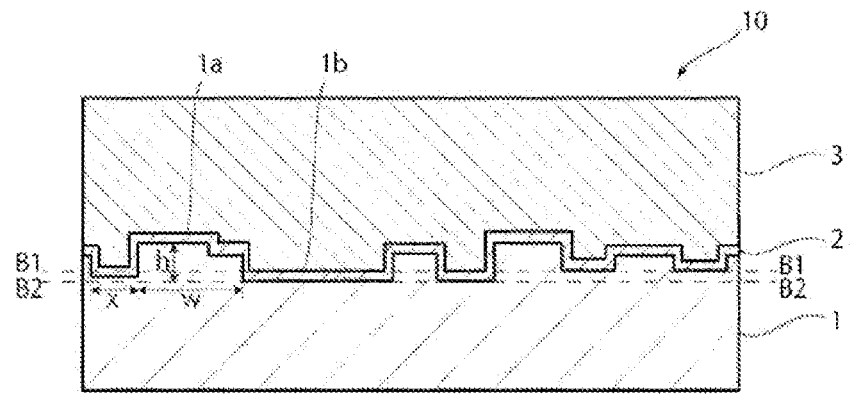
FIG. 9 is a schematic view of a cross-section structure of one form of the decorative sheet according to the second embodiment of the present disclosure.
Figure 10:
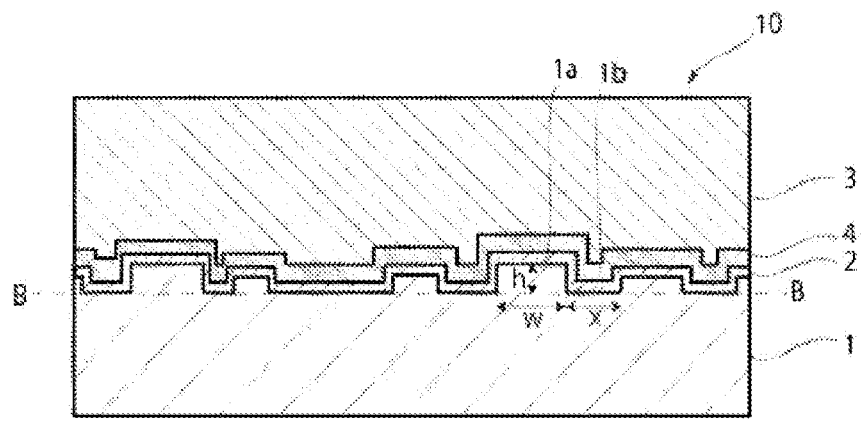
FIG. 10 is a schematic view of a cross-section structure of one form of the decorative sheet according to the second embodiment of the present disclosure.
Figure 11:
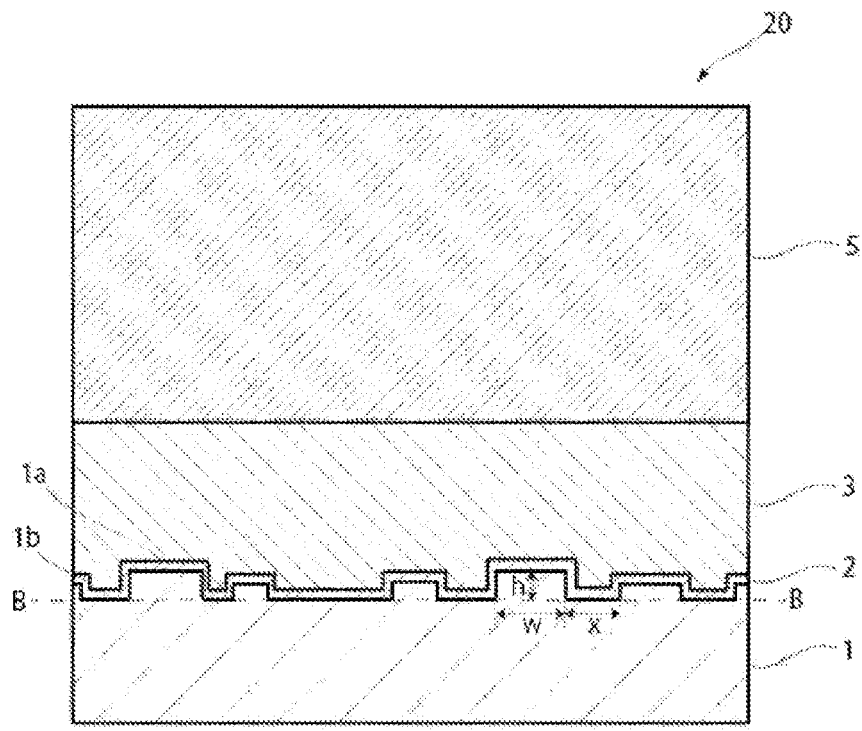
FIG. 11 is a schematic view of a cross-section structure of one form of a decorative resin molded article according to the second embodiment of the present disclosure.

Examples of the laminated structure of the decorative sheet according to the second embodiment of the present disclosure include a laminated structure in which a transparent resin film layer and a decorative layer are laminated in this order; a laminated structure in which a transparent resin film layer, a decorative layer and a support film layer are laminated in this order; a laminated structure in which a transparent resin film layer, a decorative layer, an adhesive layer and a support film layer are laminated in this order; and a laminated structure in which a transparent resin film layer, a decorative layer, an adhesive layer, a support film layer and an adhesive layer are laminated in this order. As an aspect of the laminated structure of the decorative sheet according to the second embodiment of the present disclosure, a schematic view of a cross-sectional structure of one form of a decorative sheet in which a transparent resin film layer and a decorative layer are laminated is shown in FIGS. 6 and 7. As an aspect of the laminated structure of the decorative sheet according to the second embodiment of the present disclosure, a schematic view of a cross-sectional structure of one form of a decorative sheet in which a transparent resin film layer, a decorative layer and a support film layer are laminated in this order is shown in FIGS. 8 and 9. As an aspect of the laminated structure of the decorative sheet according to the second embodiment of the present disclosure, a schematic view of a cross-sectional structure of one form of a decorative sheet in which a transparent resin film layer, a decorative layer, an adhesive layer and a support film layer are laminated in this order is shown in FIG. 10.

Uneven Shape of Decorative Sheet

The decorative sheet 10 according to the first embodiment of the present disclosure includes the transparent resin film layer 1 having an uneven shape on one surface thereof, and the decorative layer 2 formed along the uneven shape of the transparent resin film layer 1. That is, the uneven shape formed at an interface between the transparent resin film layer 1 and the decorative layer 2 forms an uneven shape inside the decorative sheet. When the decorative sheet according to the first embodiment of the present disclosure is observed from the transparent resin film layer 1 side (that is, a side on which the decorative sheet 10 laminated with the molded resin layer 5 to form a decorative resin molded article 20 is visually recognized), the uneven shape is visually recognized through the transparent resin film layer 1, so that it is possible to perceive a high stereoscopic feeling.

In the first embodiment of the present disclosure, the uneven shape of the transparent resin film layer 1 includes a plurality of convex portions 1a protruding from the transparent resin film layer 1 side to the decorative layer 2 side. In the uneven shape, the plurality of convex portions 1a are each formed in stepwise shape. That is, in the decorative sheet according to the first embodiment of the present disclosure, a plurality of convex portions 1a in the uneven shape of the transparent resin film layer 1 which is formed inside the decorative sheet are formed in a stepwise shape to present a stereoscopic design such that a pyramid is seen from above, and stepped edges are formed in the convex portions to suitably suppress deterioration of the three-dimensional shape by heat and pressure during molding of the decorative sheet, so that it is possible to present an excellent stereoscopic feeling from the internal uneven shape.

In the decorative sheet 10 according to the first embodiment of the present disclosure, a height of each stepwise convex portion 1a (H), a height of each step (h), a width of each step (wn), a width of an uppermost step (w), a shape of the convex portion 1a in plan view, and the like are adjusted, and the convex portions 1a are formed in polygonal and circular shapes in plan view, whereby individual convex portions having a variety of shapes can be formed in a stepwise shape, and designs with diversity can be imparted to the surface of the decorative resin molded article.

Figure 2:
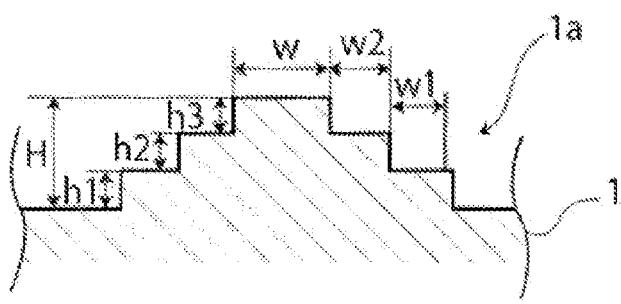
FIG. 2 is a schematic sectional view for illustrating a stepwise shape of convex portions of a transparent resin film layer according to the first embodiment.
Figure 5:
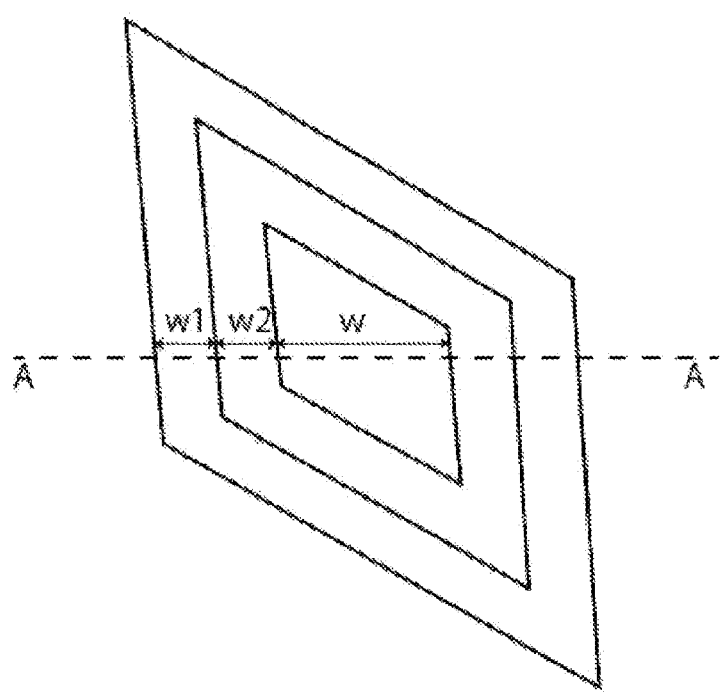
FIG. 5 is a schematic plan view for illustrating a method for measuring a width of each step and a width of an uppermost step of the convex portions of the transparent resin film layer according to the first embodiment.

The schematic view of FIG. 2 shows an example in which the number of steps of the convex portion 1a is 3, the overall height of the convex portion 1a is H, the height of the first step is h1, the height of the second step is h2, the height of the third step is h3, the width of the first step is w1, the width of the second step is w2, and the width of the third step (that is, the width of the uppermost step) of the third step is w. FIG. 5 shows a schematic view where the convex portion 1a has a rhombic shape in plan view.

The number of steps of the convex portion 1a is not limited, but is preferably, for example, about 2 to 9 depending on the width w and the height h of each step when individual convex portions are to have a stepwise shape even after formation of the decorative sheet.

From the viewpoint of suitably exhibiting the effects of the invention according to the first embodiment of the present disclosure, the height (overall height) of the convex portion 1a (H) is preferably about 3 to 100 µm, more preferably about 8 to 60 µm.

From the viewpoint of suitably exhibiting the effects of the invention according to the first embodiment of the present disclosure, the height of each step (h) of the convex portion 1a is preferably about 3 to 50 µm, more preferably about 8 to 30 µm.

From the viewpoint of suitably exhibiting the effects of the invention according to the first embodiment of the present disclosure, the width of each step of the convex portion 1a (wn) is preferably about 10 to 200 µm, more preferably about 20 to 100 µm.

From the viewpoint of suitably exhibiting the effects of the invention according to the first embodiment of the present disclosure, the width of the uppermost step (w) of the convex portion 1a is preferably about 10 to 300 µm, more preferably about 20 to 200 µm.

The width of each step and the width of the uppermost step are measured in a direction perpendicular to a side forming a peripheral edge (outer edge) of the convex portion in plan view of the convex portion (for example, a direction perpendicular to sides opposed to each other in the case of a rhombic shape as shown in the schematic view of FIG. 5, and a direction perpendicular to the tangent line in the case of a circular shape).

Figure 4:
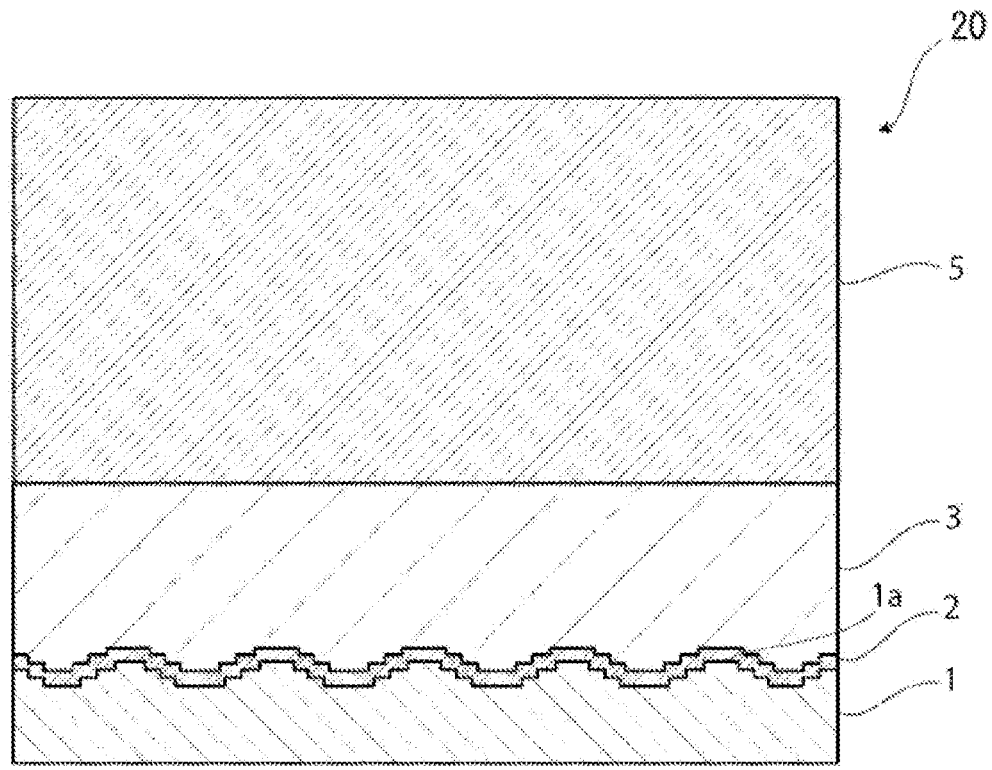
FIG. 4 is a schematic view of a cross-section structure of one form of the decorative resin molded article according to the first embodiment of the present disclosure.

Note that while FIGS. 1, 3 and 4 show an aspect in which the convex portions 1a are arranged independently of each other, the convex portions 1a may be connected to each other at least in part. Examples of the aspect in which the convex portions 1a are connected include an aspect in which a plurality of convex portions (stepwise convex portions) forming each convex portion 1a are connected to each other to form one layer having an uneven shape.

The arrangement pattern of convex portions 1a is not limited. For example, by arranging a large number of convex portions 1a in a matrix, the decorative sheet 10 having convex portions 1a formed in a matrix on a surface thereof is obtained.

The shape of each convex portion 1a in plan view (the shape of the outer edge) is not limited, and may be, for example, a polygonal shape (for example, a triangular shape, a quadrangular shape (a square shape, a rectangular shape, a rhombic shape or the like), a pentagonal shape, a hexagonal shape or the like), a circular shape (a precisely circular shape, an elliptical shape or the like), or another geometric picture.

In the decorative sheet according to the first embodiment of the present disclosure, the uneven shape may be formed in at least a part of the region where a high stereoscopic feeling from the uneven shape is imparted in observation of the decorative sheet from the transparent resin film layer 1. That is, in the decorative sheet according to the first embodiment of the present disclosure, the uneven shape may be formed in a part of the region or in the entire region.

The decorative sheet 10 according to the second embodiment of the present disclosure includes the transparent resin film layer 1 having an uneven shape on one surface thereof, and the decorative layer 2 formed along the uneven shape of the transparent resin film layer 1. That is, the uneven shape formed at an interface between the transparent resin film layer 1 and the decorative layer 2 forms an uneven shape inside the decorative sheet. When the decorative sheet according to the second embodiment of the present disclosure is observed from the transparent resin film layer 1 side (that is, a side on which the decorative sheet 10 laminated with the molded resin layer 5 to form a decorative resin molded article 20 is visually recognized), the uneven shape is visually recognized through the transparent resin film layer 1, so that it is possible to perceive a high stereoscopic feeling.

In the second embodiment of the present disclosure, the uneven shape of the transparent resin film layer 1 includes a plurality of convex portions 1a having different heights and protruding from the transparent resin film layer 1 side to the decorative layer 2 side. Here, the term "a plurality of convex portions 1a having different heights" specifically means including a plurality of convex portions that are different in height by 5 µm or more. In the uneven shape, the ratio of the height h (µm) to the width w (µm) (h/w) in each of a plurality of convex portions 1a is 100% or less. That is, in the decorative sheet according to the second embodiment of the present disclosure, a plurality of convex portions 1a having different heights are formed, and furthermore, the ratio of the height h to the width w (h/w) of the convex portion is reduced in the uneven shape of the transparent resin film layer 1 which is formed inside the decorative sheet, whereby the uneven shape can be visually recognized at various angles, so that it is possible to perceive an excellent stereoscopic feeling.

From the viewpoint of suitably exhibiting the effects of the second embodiment of the present disclosure, the ratio (h/w) is preferably about 10 to 100%, more preferably about 20 to 60%.

The height h of each convex portion 1a is determined by measuring a difference (distance) between the position of the concave portion 1b (line B) and the highest position of the convex portion 1a on a cross-section of the decorative sheet 10 in a thickness of the transparent resin film layer 1 as shown in, for example, the schematic diagrams of FIGS. 6 to 11. In the case where the convex portion 1a of the transparent resin film layer has different heights at both ends on a cross-section of the decorative sheet in the thickness direction (lines B1 and B2) as shown in, for example, FIG. 7, the height h with a large value is adopted. In the case where a plurality of convex portions 1a having different heights are combined to form one convex portion 1a having parts different in height as shown in FIG. 7, the height h with a large value is adopted. The height for a plurality of convex portions is measured at three or more locations on the above-described cross-section, and evaluated.

From the viewpoint of suitably exhibiting the effects of the invention according to the second embodiment of the present disclosure, the height of the convex portion 1a (h) is preferably about 3 to 100 μm, more preferably about 8 to 60 μm.

From the viewpoint of suitably exhibiting the effects of the invention according to the second embodiment of the present disclosure, the width of the convex portion 1a (w) is preferably about 30 to 500 μm, more preferably about 100 to 300 μm.

From the viewpoint of suitably exhibiting the effects of the invention according to the second embodiment of the present disclosure, the width between the convex portions 1a (x) is preferably about 3 to 200 μm, more preferably about 10 to 150 μm.

Note that the width x between convex portions is a distance between the convex portion 1a whose height h and width w have been measured and each of convex portions located on both sides of the convex portion 1a, and the width w with a smaller value is adopted.

The design presented by the uneven shape of the transparent resin film layer 1 which is formed inside the decorative sheet according to the second embodiment of the present disclosure is not limited, and is particularly preferably a stripe pattern or a carbon pattern, for example.

In the decorative sheet according to the second embodiment of the present disclosure, the uneven shape may be formed in at least a part of the region where a high stereoscopic feeling from the uneven shape is imparted in observation of the decorative sheet from the transparent resin film layer 1. That is, in the decorative sheet according to the second embodiment of the present disclosure, the uneven shape satisfying the above-described relationship may be formed in a part of the region or in the entire region.

Composition of Each Layer Forming Decorative Sheet

[Transparent Resin Film Layer 1]

In the decorative sheet 10 of the present disclosure, the transparent resin film layer 1 is typically a layer provided so as to be located on outermost surfaces of the decorative sheet 10 and the decorative resin molded article 20. From the viewpoint of improving the moldability of the decorative sheet 10 of the present disclosure, the material of the transparent resin film layer 1 is preferably a thermoplastic resin. Since the decorative resin molded article in which the decorative sheet of the present disclosure is used is observed from the transparent resin film layer 1 side, the transparent resin film layer 1 is required to have transparency for presenting a high stereoscopic feeling from the uneven shape. Note that the term "transparent" as used herein includes being semi-transparent or colored transparent such that the uneven shape is visually recognized through the transparent resin film layer 1.

The transparent resin film layer 1 has an uneven shape on one surface thereof. As described later, the uneven shape is formed by embossing. For example, by laminating the transparent resin film layer 1 and the decorative layer 2 and applying embossing from the decorative layer 2 side, an uneven shape extending from the decorative layer 2 to the transparent resin film layer 1 can be formed.

The thermoplastic resin used for the transparent resin film layer 1 is preferably an acryl-based resin, a vinyl chloride resin, an ABS resin (acrylonitrile-styrene-butadiene copolymer), a styrene resin, a polycarbonate resin, a polyester resin such as polyethylene terephthalate or a moldable polyester resin, a polyolefin-based resin such as polyethylene, polypropylene, polymethylpentene, polybutene, an ethylene-propylene copolymer, a propylene-butene copolymer or an olefin-based thermoplastic elastomer, or the like. Among them, an acryl-based resins and a polyester resin are more preferable, and an acryl-based resin is particularly preferable. The thermoplastic resins may be used alone, or may be used in combination of two or more thereof.

As the acryl-based resin, for example, acrylic resins such as polymethyl (meth)acrylate, polybutyl (meth)acrylate, a methyl (meth)acrylate-butyl (meth)acrylate copolymer, and a methyl (meth)acrylate-styrene copolymer are used alone or as a mixture of two or more thereof. In the present disclosure, (meth)acrylate means acrylate or methacrylate.

As the polyester resin, a polyester-based thermoplastic elastomer, an amorphous polyester, or the like may be used. Examples of the polyester-based thermoplastic elastomer include block polymers in which high-crystallinity aromatic polyester having a high melting point is used for the hard segment and amorphous polyether having a glass transition temperature of −70° C. or lower, or the like is used for the soft segment. As the high-crystallinity aromatic polyester having a high melting point, for example, polybutylene terephthalate is used, and as the amorphous polyether, polytetramethylene glycol or the like is used. The amorphous polyester is typically an ethylene glycol-1,4-cyclohexanedimethanol-terephthalic acid copolymer.

As the transparent resin film layer 1, for example, a single-layered or multi-layered resin film made from any of the above-described resins. If necessary, various additives such as a stabilizer, a plasticizer, a colorant, an ultraviolet absorbent, a hindered amine-based light stabilizer, and an extender pigment may be appropriately added to the transparent resin film layer 1 for adjusting physical properties. One of these additives may be used alone, or may be used in combination of two or more thereof. The transparent resin film layer 1 may be colored as long as transparency is not impaired. For coloring the transparent resin film layer 1, for example, a known colorant exemplified in the later-described decorative layer 2 may be used.

The thickness of the transparent resin film layer 1 (total thickness in the case of a multi-layer) is not limited, but is preferably about 30 to 300 μm, more preferably about 100 to 200 μm from the viewpoint of cost, performance required for a decorative resin molded article, moldability of a decorative sheet, and the like. Note that the thickness of the transparent resin film layer 1 is a thickness at a part of the uneven shape where a concave portion is not formed.

If necessary, known easy-adhesive treatment such as corona discharge treatment, plasma treatment, or formation of a primer layer with a urethane resin or the like may be applied to a front surface, a back surface or both front and back surfaces of the transparent resin film layer 1 for improving adhesion with other layers that are in contact with the transparent resin film layer 1.

If necessary, a surface protective layer (not shown) may be further provided on at least a part of a surface of the transparent resin film layer 1 on a side opposite to the decorative layer 2 for the purpose of, for example, improving the surface physical properties of the decorative sheet and providing a matt-toned design.

The resin for forming the surface protective layer is not limited, and examples thereof include thermosetting resins, ionizing radiation curable resins, and thermoplastic resins. Specific examples of the resin for forming the surface protective layer include two-liquid curable resins, and resins made from a matt coating agent containing a matting agent. Here, the two-liquid curable resin is preferably a two-liquid curable resin of a polyol and an isocyanate.

Examples of the polyol include various polyols such acrylic polyols, polyester polyols, and epoxy polyols, with acrylic polyols being preferable. Examples of the acrylic polyol include vinyl chloride-modified acrylic polyols, vinyl chloride-vinyl acetate-modified acrylic polyols, chlorinated polyolefin-modified acrylic polyols, methyl (meth)acrylate-2-hydroxyethyl (meth)acrylate copolymers, octyl (meth) acrylate-ethylhexyl (meth)acrylate-2-hydroxyethyl (meth) acrylate copolymers, and methyl (meth)acrylate-butyl (meth)acrylate-2-hydroxyethyl (meth)acrylate-styrene copolymers, with vinyl chloride-modified acrylic polyol being particularly preferable.

As the isocyanate, a heretofore known compound may be appropriately used. Examples thereof include polyisocyanates such as aromatic isocyanates such as 2,4-tolylene diisocyanate (TDI), xylene diisocyanate (XDI), naphthalene diisocyanate and 4,4-diphenylmethane diisocyanate; and aliphatic (or alicyclic) isocyanates such as 1,6-hexamethylene diisocyanate (HMDI), isophorone diisocyanate (IPDI), methylene diisocyanate (MDI), hydrogenated tolylene diisocyanate and hydrogenated diphenylmethane diisocyanate. Alternatively, adducts or multimers of these various isocyanates, for example, adducts of tolylene diisocyanate and trimers of tolylene diisocyanate are used.

The matting agent used for the matt coating agent is not limited, and examples thereof include particles made from an inorganic substance such as silica, alumina, calcium carbonate, aluminosilicate or barium sulfate, an organic polymer such as acrylic beads, polyethylene, an urethane resin, polycarbonate or polyamide (nylon), or the like. The average particle size of the particles is preferably 0.5 to 20 μm, more preferably 0.5 to 10 μm, and the amount of the particles added is preferably 2 to 40 mass %, more preferably 5 to 30 mass % in terms of a matt coating agent (excluding the solvent content). The shape of the particles is a polyhedral shape, a spherical shape, a scaly shape or the like. Among the inorganic and organic particles, silica particles are preferable.

The matting agent is preferably transparent. Examples of such a matting agent that may be used include inorganic matting agents made from particles of silica, spherical silica, alumina, kaolinite, calcium carbonate, barium sulfate or glass, and organic matting agents such as polycarbonate resins, acrylic resins, polyamide (nylon) resins, urea resins and silicon-based resins. The shape of the particles of the matting agent is a spherical shape, a polyhedral shape, a scaly shape or the like. The particle diameter of the matting agent is about 1 to 10 μm. The amount of the matting agent added may be set so as to achieve a required low level of gloss. It is also preferable to select a matting agent having excellent wear resistance because the surface protective layer forms an outermost surface. Examples of such a matting agent include spherical silica and alumina. Note that the average particle diameter of the matting agent is typically 1 to 10 km.

[Decorative Layer 2]

In the decorative sheet of the present disclosure, the decorative layer 2 is a provided along the uneven shape of the transparent resin film layer for imparting a high stereoscopic feeling from the uneven shape to the decorative sheet. As shown in, for example, FIGS. 1, 3, 4 and 6 to 11, the decorative layer 2 is laminated along the uneven shape of the transparent resin film layer 1, and the decorative layer 2 fills concave portions 1b of the uneven shape of the transparent resin film layer 1. A surface of the decorative layer 2 on a side opposite to the transparent resin film layer 1 has concave portions.

The decorative layer 2 can be formed from a pattern layer and/or a solid printing layer. The picture of the pattern layer is arbitrary, and can be selected in conformity with the design presented by the uneven shape of the transparent resin film layer 1. As the picture of the pattern layer, the above-described stripe pattern, carbon pattern and the like, and for example, wood grain, stone grain, cloth grain, sand grain, leather drawing patterns, tiling patterns, brick masonry patterns, geometric patterns, characters, symbols and the like are used alone or in combination of two or more thereof according to the use purpose.

The decorative layer 2 can be formed by applying a decorative layer forming ink composition (by printing) to the transparent resin film layer 1. The decorative layer forming ink composition contains a binder resin, a colorant such as a pigment or a dye, and various additives appropriately added. Examples of the binder resin include acrylic resins, vinyl chloride-vinyl acetate copolymers, polyester resins, cellulose-based resins, chlorinated polypropylene, urethane resins, and polyamide resins. One selected from the above-mentioned resins, or a mixture of two or more of the resins is used. The binder resins may be used alone, or may be used in combination of two or more thereof.

Examples of the colorant which is used include inorganic pigments such as titanium white, zinc white, carbon black, iron black, rouge, chrome vermilion, cadmium red, ultramarine, cobalt blue, yellow lead and titanium yellow, organic pigments (including dyes) such as phthalocyanine blue, indanthrene blue, isoindolinone yellow, benzidine yellow, quinacridone red, polyazo red and perylene red, and metallic pigments composed of scaly foil powder of aluminum, brass or the like, and pearlescent (pearl) pigments composed of scaly foil powder of titanium dioxide-coated mica, basic lead carbonate or the like. The colorants may be used alone, or may be used in combination of two or more thereof.

Specific examples of the decorative layer 2 include solid printing layers of metallic color.

The decorative layer 2 can be formed by applying a decorative layer forming ink onto the transparent resin film layer 1 using a printing method such as gravure printing, silk screen printing or offset printing, a known coating method such as roll coating, or the like.

The thickness of the decorative layer 2 is not limited, but is preferably about 0.5 to 20 µm, more preferably about 1 to 10 µm. Note that the thickness of the decorative layer 2 is a thickness at a part of the uneven shape where a concave portion is not formed.

The decorative layer 2 may be a thin metal film layer. Examples of the metal for forming the thin metal film layer include tin, indium, chromium, aluminum, nickel, copper, silver, gold, platinum, zinc and an alloy containing at least one of these metals. The method for forming a thin metal film layer is not limited, and examples thereof include a vapor deposition method such as a vacuum vapor deposition method, a sputtering method and an ion plating method each using the above-mentioned metal. Here, the thickness of the decorative layer 2 (thin metal film layer) is not limited, but is about 0.6 to 1.8, preferably about 0.8 to 1.5 in terms of an optical density (OD value), from the viewpoint of improving the designability and moldability of the decorative sheet. For improving adhesion with the adjacent layer, the front or back surface of the thin metal film layer may be provided with an adhesive layer made from a known resin.

[Support Film Layer 3]

In the decorative sheet of the present disclosure, the support film layer 3 is provided on the decorative sheet 10 on the decorative layer 2 side (a side opposite to the transparent resin film layer 1) to serve as a support member if necessary. When used for manufacturing a decorative resin molded article by an insert molding method as described later, the decorative sheet of the present disclosure preferably includes the support film layer 3.

The material of the support film layer 3 is not limited, and examples thereof include ABS resins, polyolefin resins, styrene resins, (meth)acrylic resins, vinyl chloride resins, and polycarbonate resins. The polyolefin resin is preferably a polypropylene resin. Among these resins, ABS resins and polypropylene resins are particularly preferable. An ABS resin is preferable in the case where the molding resin forming the molded resin layer 5 is an ABS resin, and a polypropylene resin is preferable in the case where the molding resin is a polypropylene resin.

In the decorative sheet of the present disclosure, the support film layer 3 may be laminated so as to fill concave portions of the uneven shape on the decorative layer 2 side as shown in FIGS. 1, 3, 4 and 8 to 11. Examples of the method for filling the concave portions with the support film layer 3 include a method in which the support film layer 3 is softened by heating, and then laminated on an uneven shape-formed surface.

In the decorative sheet 10 of the present disclosure, all the concave portions of the uneven shape on the decorative layer 2 side (concave portions of the uneven shape of the decorative layer 2, concave portions of the uneven shape of the adhesive layer 4 in the case where the decorative sheet further includes the adhesive layer 4 described later, and the like) may be filled with the support film layer 3, or a part of the concave portions may be filled with the support film layer 3, with a gap existing between the support film layer 3 and the uneven shape on the decorative layer 2 side.

The thickness of the support film layer 3 is not limited, and is, for example, about 0.1 to 0.5 mm, more preferably about 0.2 to 0.4 mm. Note that the thickness of the support film layer 3 is a thickness at a part where concave portions of the uneven shape of the decorative sheet 10 on the decorative layer 2 side are not filled.

[Adhesive Layer 4]

In the decorative sheet 10 according of the present disclosure, the adhesive layer 4 may be provided between the decorative layer 2 and the support film layer 3 if necessary for the purpose of, for example, improving adhesion between these layers. Note that if necessary, an adhesive layer may be provided on a surface of the support film layer 3 on a side opposite to the decorative layer 2 (not shown).

In the present disclosure, in the case where the adhesive layer 4 is provided between the decorative layer 2 and the support film layer 3, an uneven shape can be formed on the decorative layer 2 on a side opposite to the transparent resin film layer 1 by embossing, followed by formation of the adhesive layer on the uneven shape.

Examples of the material of the adhesive for forming the adhesive layer 4 include two-liquid curable urethane resins with an isocyanate as a curing agent, chlorinated polyolefins such as chlorinated polypropylene, (meth)acrylic resins, vinyl chloride-vinyl acetate copolymers, and mixtures of a (meth)acrylic resin and a vinyl chloride-vinyl acetate copolymer. As (meth)acrylic resins and vinyl chloride-vinyl acetate copolymers in the adhesive layer, those that are the same as in decorative layer 2 described above may be used. If the support film layer 3 is an ABS resin or a polyolefin resin, it is preferable that a two-liquid curable urethane resin with an isocyanate as a curing agent, a chlorinated polyolefin such as chlorinated polypropylene, or the like is used for the adhesive layer.

The adhesive layer 4 can be formed from the above-described adhesive by a known printing or coating method such as gravure printing or roll coating. The thickness of the adhesive layer is not limited, and is typically about 1 to 50 µm.

Embossing

In the decorative sheet 10 according to the first embodiment of the present disclosure, the internal uneven shape can be formed by embossing. Specifically, a sheet including at least the transparent resin film layer 1 and the decorative layer 2 is prepared, and embossing is applied to the sheet from the decorative layer 2 side to form an uneven shape in which a concave portion extends to the transparent resin film layer 1. When the shape of the convex portion given by an embossing plate is a stepwise shape, it is possible to form an uneven shape having a plurality of stepwise convex portions 1a protruding from the transparent resin film layer 1 side to the decorative layer 2 side.

In the decorative sheet 10 according to the second embodiment of the present disclosure, the internal uneven shape can be formed by embossing. Specifically, a sheet including at least the transparent resin film layer 1 and the decorative layer 2 is prepared, and embossing is applied to the sheet from the decorative layer 2 side to form an uneven shape in which a concave portion extends to the transparent resin film layer 1. By adjusting the plate depth of the embossing plate used for embossing, an uneven shape can be formed in which a plurality of convex portions 1a protrude from the transparent resin film layer 1 side to the decorative layer 2 side, and a ratio of the height h (µm) to the width w (µm) (h/w) in the plurality of convex portions 1a is 100% or less.

As a method for applying embossing, a method of embossing under heat and pressure is typically used. In the method of embossing under heat and pressure, a surface of a sheet is softened by heating, and pressed with an embossing plate to give uneven patterns of the embossing plate thereon, which are fixed by cooling. The shape of the embossing plate used in embossing corresponds to the uneven shape formed on the transparent resin film layer 1 and the decorative layer 2. For embossing, for example, a known sheet-type or rotary-type embossing machine can be used.

Examples of the method of embossing under heat and pressurize in the first embodiment include a method in which embossing is performed on the decorative layer 2, and a method in which the decorative layer 2 is applied onto the uneven shape of the transparent resin film layer 1 with the uneven shape so as to extend along the uneven shape. For example, by embossing, a concave portion extending to the transparent resin film layer 1 can be formed with the embossing plate reaching from the decorative layer 2 to the transparent resin film layer 1. Specifically, a sheet including at least the decorative layer 2 and the transparent resin film layer 1 is prepared, and embossing is applied onto the decorative layer 2 to form a region provided with an uneven shape including a plurality of stepwise convex portions 1a.

Examples of the method of embossing under heat and pressurize in the second embodiment include a method in which embossing is performed on the decorative layer 2, and a method in which the decorative layer 2 is applied onto the uneven shape of the transparent resin film layer 1 with the uneven shape so as to extend along the uneven shape. For example, by embossing, a concave portion extending to the transparent resin film layer 1 can be formed with the embossing plate reaching from the decorative layer 2 to the transparent resin film layer 1. Specifically, a sheet including at least the decorative layer 2 and the transparent resin film layer 1 is prepared, and embossing is applied onto the decorative layer 2 to form a region where a plurality of convex portions 1a of the uneven shape satisfy the ratio (h/w).

The heating temperature in embossing is not limited, but is preferably about 180° C. to 220° C.

As described above, in the first embodiment, a surface of the transparent resin film layer 1 on a side opposite to a surface having the uneven shape is preferably smooth, and the smoothness can be improved by mirror-finishing. The mirror-finishing of the surface of the transparent resin film layer 1 can be performed using a mirror-finished roller or the like. Specifically, the mirror-finishing can be performed by making the embossed sheet pass between a mirror-finished roller and a rubber roller, and applying heat and pressure. The mirror-finished roller is pressed against the surface of the transparent resin film layer 1, and a rubber roller is pressed from the back side of the sheet. As the mirror-finished roller, a metallic roller obtained by performing chromium plating or the like on a surface of an iron core or the like to form the surface into a mirror-finished surface may be used. As the rubber roller, a roller obtained by covering a surface of an iron core with rubber such as silicone rubber may be used. In the second embodiment, the uneven shape is pressed with a mirror-finished roller immediately after being formed by embossing, whereby the ratio (h/w) can be adjusted to 100% or less. In the second embodiment, mirror-finishing may be performed in such a manner as to cause substantially no change in the ratio (h/w) in the case where the ratio (h/w) is satisfied through embossing.

By mirror-finishing, an excellent mirror-finishing property can be imparted to the front side of the transparent resin film layer 1. The mirror-finishing property is preferably 1 µm or less, more preferably 0.1 µm or less in terms of an arithmetic average roughness Ra in JIS B 0601 (1996). That is, the mirror-finished surface is a surface having an arithmetic average roughness Ra of preferably 1 µm or less, more preferably 0.1 µm or less.

In the second embodiment of the present disclosure, it is also possible to adjust the ratio (h/w) to 55% or less by laminating the support film 3 so as to fill concave portions of the uneven shape of the sheet after the embossing step. The method for laminating the support film layer 3 so as to fill concave portions is as follows. The ratio (h/w) may be adjusted by laminating the support film layer 3 when the ratio (h/w) in the convex portion 1a of the uneven shape in the embossing is not 100% or less, or is 100% or less. In the case where the ratio (h/w) is satisfied through embossing, the support film 3 may be laminated in such a manner as to cause substantially no change in the ratio (h/w).

Further, in the second embodiment of the present disclosure, it is also possible to adjust the ratio (h/w) to 100% or less by performing both the mirror-finishing and the lamination of the support film 3 after embossing. Specifically, the ratio (h/w) can be adjusted to 100% or less by carrying out, after the embossing step, a step of laminating a support film so as to fill concave portions of the uneven shape of the sheet, and a step of applying mirror-finishing to a surface of the transparent resin film layer 1 on a side opposite to a side where the uneven shape is formed. When both mirror-finishing and lamination of the support film 3 are performed, their order is not limited, but from the viewpoint of protecting the mirror surface formed by mirror-finishing, it is preferable to perform mirror-finishing after laminating the support film 3.

2. Decorative Resin Molded Article

The decorative resin molded article 20 according to the first embodiment of the present disclosure is formed by integrating the decorative sheet 10 according to the first embodiment of the present disclosure and a molding resin. That is, the decorative resin molded article 20 according to the first embodiment of the present disclosure includes the transparent resin film layer 1 having an uneven shape on one surface thereof, the decorative layer 2 formed along the uneven shape of the transparent resin film layer 1, and the molded resin layer 5, in which the uneven shape includes a plurality of convex portions 1a protruding from the transparent resin film layer 1 side to the decorative layer 2 side, and the plurality of convex portions 1a are each formed in a stepwise shape. As described for the decorative sheet 10 according to the first embodiment of the present disclosure, the decorative resin molded article may be provided with the support film layer 3, the adhesive layer 4, an adhesive layer provided on a surface of the support film layer 3 on a side opposite to the decorative layer 2, and the like.

The decorative resin molded article 20 according to the second embodiment of the present disclosure is formed by integrating the decorative sheet 10 of the present disclosure and a molding resin. The decorative resin molded article 20 includes the transparent resin film layer 1 having an uneven shape on one surface thereof, the decorative layer 2 formed along the uneven shape of the transparent resin film layer 1, and the molded resin layer 5, in which the uneven shape includes a plurality of convex portions 1a having different heights and protruding from the transparent resin film layer 1 side to the decorative layer 2 side, and a ratio of the height h (µm) to the width w (µm) (h/w) in each of the plurality of convex portions 1a is 100% or less. As described for the decorative sheet 10 according to the second embodiment of the present disclosure, the decorative resin molded article may be provided with the support film layer 3, the adhesive layer 4, an adhesive layer provided on a surface of the support film layer 3 on a side opposite to the decorative layer 2, and the like.

The decorative resin molded article of the present disclosure is prepared by, for example, various injection molding methods such as an insert molding method, an injection molding simultaneous decorating method, a blow molding method and a gas injection molding method using the decorative sheet of the present disclosure. Among these injection molding methods, an insert molding method and an injection molding simultaneous decorating method are preferable. The decorative resin molded article of the present disclosure can also be produced by a decoration method including bonding the decorative sheet of the present disclosure onto a three-dimensional resin molded product (molded resin layer) prepared in advance, such as a vacuum press-bonding method.

In the insert molding method, first, the decorative sheet of the present disclosure is vacuum molded (off-line premolding) into a molded article surface shape in advance using a vacuum molding die, and an unnecessary portion is then trimmed off if necessary to obtain a molded sheet in a vacuum molding step. The molded sheet is inserted into an injection molding die, the injection molding die is clamped, the fluidized resin is injected into the die and solidified, and the decorative sheet is integrated with the outer surface of the resin molded product in parallel to the injection molding to produce a decorative resin molded article.

More specifically, the decorative resin molded article of the present disclosure is produced by an insert molding method including the following steps:

a vacuum molding step of molding the decorative sheet of the present disclosure into a three-dimensional shape by a vacuum molding die in advance;

a trimming step of trimming an excess portion of the vacuum-molded decorative sheet to obtain a molded sheet; and an integration step of inserting the molded sheet into an injection molding die, closing the injection molding die, and injecting a fluidized resin into the injection molding die to integrate the resin with the molded sheet.

In the vacuum molding step in the insert molding method, the decorative sheet may be heated and molded. The heating temperature at this time is not limited, and may be appropriately selected depending on the type of resin for forming the decorative sheet, the thickness of the decorative sheet, and the like. For example, the heating temperature can be typically about 100 to 250° C., preferably about 130 to 200° C. In the integration step, the temperature of the fluidized resin is not limited, and can be typically about 180 to 320° C., preferably about 220 to 280° C.

In the injection molding simultaneous decorating method, the decorative sheet of the present disclosure is disposed in a female die also serving as a vacuum molding die, which is provided with a suction hole for injection molding, premolding (in-line premolding) is performed with the female die, the injection molding die is then clamped, the fluidized resin is injected and filled into the die, and solidified to integrate the decorative sheet of the present disclosure with the outer surface of the resin molded product in parallel to the injection molding, thereby producing a decorative resin molded article.

More specifically, the decorative resin molded article of the present disclosure is produced by an injection molding simultaneous decorating method including the following steps:

a premolding step of premolding a decorative sheet by placing the decorative sheet of the present disclosure in such a manner that a surface of the decorative sheet on a side opposite to transparent resin film layer 1 faces a molding surface of a movable mold with the molding surface having a predetermined shape, followed by heating and softening the decorative sheet, and vacuum-sucking the decorative sheet from the movable mold side to bring the softened decorative sheet into close contact with the movable mold along the molding surface thereof;

an integration step of clamping the movable mold with the decorative sheet brought into close contact with the movable mold along the molding surface thereof and a fixed mold, then injecting and filling the fluidized resin into a cavity formed by both the molds, and thereby solidifying the resin to form a resin molded article, and integrating the resin molded article with the decorative sheet; and a take-out step of separating the movable mold from the fixed mold to take out a resin molded article in which all the layers of the decorative sheet are laminated.

The heating temperature in the premolding step in the injection molding simultaneous decorating method is not limited, may be appropriately selected depending on the type of resin for forming the decorative sheet, the thickness of the decorative sheet, and the like, and can be typically about 70 to 130° C. In the injection molding step, the temperature of the fluidized resin is not limited, and can be typically about 180 to 320° C., preferably about 220 to 280° C.

In the vacuum press-bonding method, first the decorative sheet of the present disclosure and the resin molded body are placed in a vacuum press-bonding machine including a first vacuum chamber situated on the upper side and a second vacuum chamber situated on the lower side in such a manner that the decorative sheet is on the first vacuum chamber side and the resin molded body is on the second vacuum chamber side, and a side of the decorative sheet which is opposite to the transparent resin film layer 1 faces the resin molded body side. The two vacuum chambers are then evacuated. The resin molded body is placed on a lift table that is provided on the second vacuum chamber side and is capable of moving up and down. Then, the first vacuum chamber is pressurized, and the molded body is pressed against the decorative sheet with the lift table, and by using a pressure difference between the two vacuum chambers, the decorative sheet is bonded to the surface of the resin molded body while being stretched. Finally, the two vacuum chambers are released to atmospheric pressure, and an unnecessary portion of the decorative sheet is trimmed off if necessary, whereby the decorative resin molded article of the present disclosure can be obtained.

Preferably, the vacuum press-bonding method includes the step of heating the decorative sheet for softening the decorative sheet to improve the moldability thereof before the step of pressing the molded body against the decorative sheet. The vacuum press-bonding method including such a step may be referred to particularly as a vacuum heating and press-bonding method. The heating temperature in the step is not limited, and may be appropriately selected depending on the type of resin for forming the decorative sheet, the thickness of the decorative sheet, and the like. For example, the heating temperature can be typically about 60 to 200° C.

In the decorative resin molded article of the present invention, a resin appropriate to an intended use may be selected to form the molded resin layer. The molding resin for forming the molded resin layer may be a thermoplastic resin or may be a thermosetting resin.

Specific examples of the thermoplastic resin include polyolefin-based resins such as polyethylene and polypropylene, ABS resins, styrene resins, polycarbonate resins, acrylic resins and vinyl chloride-based resins. These thermoplastic resins may be used alone, or may be used in combination of two or more thereof.

Examples of the thermosetting resin include urethane resins and epoxy resins. These thermosetting resins may be used alone, or may be used in combination of two or more thereof.

The decorative resin molded article of the present disclosure has a high stereoscopic feeling such as a high uneven impression, stereoscopic feeling and depth feeling from an uneven shape, and high surface smoothness, and therefore can be used for, for example, interior materials or exterior materials of vehicles such as automobiles; fittings such as window frames and door frames; interior materials of buildings such as walls, floors and ceilings; housings of household electric appliances such as television receivers and air conditioners; and containers etc.

EXAMPLES

Hereinafter, the present disclosure will be described in detail by way of examples and comparative examples. However, the present disclosure is not limited to examples.

Examples 1A to 5A and Comparative Example 1A

<Manufacturing of Decorative Sheet of First Embodiment>

An acrylic film (thickness: 125 μm) smooth on both surfaces was prepared as a transparent resin film layer. An ink composition (polybutyl methacrylate/vinyl chloride-vinyl acetate copolymer) was applied to one surface of the transparent resin film layer by gravure printing to form a decorative layer (thickness: 5 μm) thereon. Next, embossing was performed on the decorative layer using an embossing plate (an embossing plate in which a plurality of concave portions having a rhombic shape, a triangular shape or a quadrangular shape (see Table 1) in plan view are formed by convex portions of the embossing plate, with the convex portions having a shape corresponding to the shape of the convex portions of the transparent resin film layer), thereby forming an uneven shape. In Example 5A, an adhesive (polyester resin composition polyester polyol:isocyanate=100:10) was further applied onto the decorative layer by gravure printing to form an adhesive layer (thickness: 30 μm).

The embossing plates used in examples and comparative examples are different. In Examples 1A to 5A, the convex portion of the embossing plate (that is, the convex portion of the transparent resin film layer) is formed in a stepwise shape, and the number of steps in the convex portion and the height of the convex portion (H), the height of each step (h), the widths of steps (w1 to w6), and the width of the uppermost step (w) are each as shown in Table 1. For example, in Example 1A, each convex portion of the transparent resin film layer had a rhombic shape in plan view and was formed in a stepwise shape (stepwise), the height of the convex portion (H) was 76 μm, the height of each step (h) was 11 μm, the width of each step (wn) was 35 μm, and the width of the uppermost step (w) was 100 μm. The width of each step and the width of the uppermost step were measured in a direction perpendicular to a side forming a peripheral edge (outer edge) of the convex portion in plan view of the convex portion (for example, a direction perpendicular to sides opposed to each other in the case of a rhombic shape as shown in the schematic view of FIG. 5). The results are shown in Table 1.

<Manufacturing of Decorative Resin Molded Article of First Embodiment>

The decorative sheet was placed in a vacuum molding machine ("VPF-T1" manufactured by Fu-se Vacuum Forming Ltd.), and heated with a heater until the surface temperature reached 160° C., thereby performing vacuum molding. The decorative sheet after molding was taken out, and trimmed, and the decorative layer side and the molding resin were integrated by insert molding to obtain a decorative resin molded article. As the molding resin, a mixture of polycarbonate and ABS resin (trade name: Cycoloy IP 1000BK manufactured by GE Plastics, Ltd.) was used.

(Evaluation of Stereoscopic Feeling)

The decorative sheet obtained as described above, the decorative sheet after molding, and the decorative resin molded article were each taken as a test sample, and placed on a horizontal plane under a white-light fluorescent lamp with the transparent resin film layer on the upper side. Next, the test sample was visually observed in a direction of 90° with respect to (from directly above) the horizontal plane at a distance of about 50 cm from the test sample, and the stereoscopic feeling was evaluated on the basis of the following evaluation criteria. The evaluation criteria are as follows.

A+: The uneven shape was visually recognized with clarity, and a stereoscopic feeling was strongly perceived.

A: The uneven shape was visually recognized, and a stereoscopic feeling was perceived.

B: It was slightly difficult to visually recognize the uneven shape, but it was confirmed that a design with a stereoscopic feeling from an uneven shape was presented.

C: The uneven shape was not confirmed.

TABLE 1

| Convex portion of transparent resin film layer | Example 1A | Example 2A | Example 3A | Example 4A | Example 5A | Comparative Example 1A |
|---|---|---|---|---|---|---|
| Stepwise or stepless | Stepwise | Stepwise | Stepwise | Stepwise | Stepwise | Stepless |
| Number of steps | Seven-step | Three-step | Five-step | Seven-step | Seven-step | Single-step |
| Shape in plan view | Rhombic | Triangular | Quadrangular | Rhombic | Rhombic | Rhombic |
| Height of convex portion (H) (μm) | 76 | 62 | 60 | 70 | 71 | 70 |
| Height of each step of convex portion (h) (μm) | 11 | 21 | 12 | 10 | 10 | |

TABLE 1-continued

| Convex portion of transparent resin film layer | Example 1A | Example 2A | Example 3A | Example 4A | Example 5A | Comparative Example 1A |
|---|---|---|---|---|---|---|
| Width of each step of convex portion (wn) (μm) | 35 | 100 | 100 | 35 | 35 | |
| Width of uppermost step of convex portion (w) (μm) | 100 | 200 | 200 | 100 | 100 | 500 |
| Stereoscopic feeling of decorative sheet before molding | A+ | A+ | A+ | A+ | A+ | A+ |
| Stereoscopic feeling of decorative sheet after molding | A+ | A | A+ | A+ | A+ | B |
| Stereoscopic feeling of decorative resin molded article | A+ | A | A+ | A+ | A+ | B |

Examples 1B to 7B and Comparative Examples 1B to 3B

<Manufacturing of Decorative Sheet of Second Embodiment>

An acrylic film (thickness: 125 μm) smooth on both surfaces was prepared as a transparent resin film layer. An ink composition (polybutyl methacrylate/vinyl chloride-vinyl acetate copolymer) was applied to one surface of the transparent resin film layer by gravure printing to form a decorative layer (thickness: 5 μm) thereon. Next, embossing was performed on the decorative layer using an embossing plate (on which a stripe pattern was formed), thereby forming an uneven shape. In Example 6B, an adhesive (polyester resin composition polyester polyol:isocyanate=100:10) was further applied onto the decorative layer by gravure printing to form an adhesive layer (thickness: 30 μm).

The embossing plates used in examples and comparative examples are different in plate depth. In Examples 1B to 7B and Comparative Example 3B, the embossing plate is not uniform in plate depth (the plate depth ranges from 30 to 60 μm in Examples 1B and 4B to 9B, from 10 to 45 μm in Example 2B, and from 5 to 30 μm in Example 3B), and in Comparative Examples 1B to 2B, the embossing plate is uniform in plate depth (the plate depth is 26 μm in Comparative Example 1 and 45 μm in Comparative Example 2B). A cross section of the obtained decorative sheet was observed with a microscope, three convex portions (different in height by 5 μm or more) in the uneven shape formed on the transparent resin film layer were randomly selected, and the convex portion width w (μm), the convex portion height h (μm), the ratio of the height h to the width w (h/w) in the convex portion, and the width between convex portions (x) (μm) were measured. In the case where the convex portion of the transparent resin film layer has different heights at both ends on a cross-section of the decorative sheet in the thickness direction as shown in, for example, FIG. 7, the height h with a large value was adopted. Similarly, in the case where a plurality of convex portions having different heights were combined to form one convex portion having parts different in height as shown in FIG. 7, the height h with a large value was adopted. Note that the width x between convex portions is a distance between the convex portion whose height h and width w have been measured and each of convex portions located on both sides of the convex portion, and the width w with a smaller value is adopted. The results are shown in Table 2.

(Evaluation of Stereoscopic Feeling 1)

The decorative sheet obtained as described above was taken as a test sample, and placed on a horizontal plane under a white-light fluorescent lamp with the transparent resin film layer on the upper side. Next, the test sample was visually observed in a direction of 90° with respect to (from directly above) the horizontal plane at a distance of about 50 cm from the test sample, and the stereoscopic feeling was evaluated on the basis of the following evaluation criteria. The evaluation criteria are as follows.

A+: The uneven shape was visually recognized with clarity, and a stereoscopic feeling was strongly perceived.

A: The uneven shape was visually recognized, and a stereoscopic feeling was perceived.

B: It was slightly difficult to visually recognize the uneven shape, but it was confirmed that a design with a stereoscopic feeling from an uneven shape was presented.

C: The uneven shape was not confirmed.

(Evaluation of Stereoscopic Feeling 2)

The decorative sheet obtained as described above was taken as a test sample, and placed on a horizontal plane under a white-light fluorescent lamp with the transparent resin film layer on the upper side. Next, the test sample was visually observed in a direction of 45° with respect to the horizontal plane at a distance of about 50 cm from the test sample, and the stereoscopic feeling was evaluated on the basis of the following evaluation criteria.

The evaluation criteria are as follows.

A+: The uneven shape was visually recognized with clarity, and a stereoscopic feeling was strongly perceived.

A: The uneven shape was visually recognized, and a stereoscopic feeling was perceived.

B: It was slightly difficult to visually recognize the uneven shape, but it was confirmed that a design with a stereoscopic feeling from an uneven shape was presented.

C: The uneven shape was not confirmed.

TABLE 2

| Uneven shape of transparent resin film layer | | Example 1B | Example 2B | Example 3B | Example 4B | Example 5B | Example 6B | Example 7B | Example 8B | Example 9B | Comparative Example 1B | Comparative Example 2B | Comparative Example 3B |
|---|---|---|---|---|---|---|---|---|---|---|---|---|---|
| Height of convex portion (h) (μm) | n1 | 45 | 39 | 22 | 53 | 43 | 44 | 43 | 55 | 35 | 26 | 45 | 53 |
| | n2 | 52 | 10 | 5 | 35 | 39 | 39 | 51 | 50 | 44 | 26 | 45 | 49 |
| | n3 | 37 | 30 | 20 | 48 | 52 | 55 | 20 | 30 | 50 | 26 | 45 | 30 |
| Width of convex portion (w) (μm) | n1 | 136 | 150 | 201 | 170 | 122 | 133 | 90 | 77 | 39 | 100 | 75 | 44 |
| | n2 | 304 | 100 | 308 | 194 | 163 | 163 | 315 | 71 | 57 | 100 | 75 | 37 |
| | n3 | 154 | 150 | 150 | 100 | 325 | 323 | 86 | 52 | 83 | 100 | 75 | 27 |
| Width between concave portions (x) (μm) | n1 | 58 | 61 | 30 | 156 | 59 | 58 | 101 | 33 | 52 | 100 | 100 | 90 |
| | n2 | 132 | 58 | 17 | 48 | 34 | 132 | 68 | 111 | 116 | 100 | 100 | 55 |
| | n3 | 36 | 3 | 10 | 19 | 130 | 36 | 30 | 120 | 67 | 150 | 100 | 105 |
| h/w (%) | n1 | 33 | 26 | 11 | 31 | 35 | 33 | 48 | 71 | 90 | 26 | 60 | 120 |
| | n2 | 17 | 10 | 2 | 18 | 24 | 24 | 16 | 70 | 77 | 26 | 60 | 132 |
| | n3 | 24 | 20 | 13 | 48 | 16 | 17 | 23 | 58 | 60 | 26 | 60 | 111 |
| Evaluation of stereoscopic feeling of decorative sheet 90° | | A+ | A+ | A | A+ | A+ | A+ | A+ | A+ | A+ | B | B | A+ |
| Evaluation of stereoscopic feeling of decorative sheet 45° | | A+ | A+ | A | A+ | A+ | A+ | A+ | A | A | B | B | B |

DESCRIPTION OF REFERENCE SIGNS

1: Transparent resin film layer
1a: Convex portion
1b: Concave portion
2: Decorative layer
3: Support film layer
4: Adhesive layer
5: Molded resin layer
10: Decorative sheet
20: Decorative resin molded article

The invention claimed is:

1. A decorative sheet comprising:
a transparent resin film layer having an uneven shape on one surface thereof; and
a decorative layer formed along the uneven shape of the transparent resin film layer,
wherein the uneven shape includes a plurality of convex portions protruding from the transparent resin film layer side to the decorative layer side, and
the plurality of convex portions are each formed in a stepwise shape.

2. The decorative sheet according to claim 1, further comprising a support film layer on the decorative layer side.

3. The decorative sheet according to claim 2, wherein the support film layer is formed so as to fill concave portions on the decorative layer side.

4. The decorative sheet according to claim 2 or 3, further comprising an adhesive layer between the decorative layer and the support film layer.

5. The decorative sheet according to any one of claims 1 to 3, wherein a surface of the transparent resin film layer on a side opposite to the decorative layer is smooth.

6. The decorative sheet according to claim 3, further comprising an adhesive layer between the decorative layer and the support film layer.

7. The decorative sheet according to claim 2, wherein a surface of the transparent resin film layer on a side opposite to the decorative layer is smooth.

8. The decorative sheet according to claim 3, wherein a surface of the transparent resin film layer on a side opposite to the decorative layer is smooth.

9. A decorative resin molded article comprising:
a transparent resin film layer having an uneven shape on one surface thereof;
a decorative layer formed along the uneven shape of the transparent resin film layer; and
a molded resin layer,
wherein the uneven shape includes a plurality of convex portions protruding from the transparent resin film layer side to the decorative layer side, and
the plurality of convex portions are each formed in a stepwise shape.

10. A decorative sheet comprising:
a transparent resin film layer having an uneven shape on one surface thereof; and
a decorative layer formed along the uneven shape of the transparent resin film layer,
wherein the uneven shape includes a plurality of convex portions having different heights and protruding from the transparent resin film layer side to the decorative layer side, and
a ratio of the height h (μm) to the width w (μm) (h/w) in each of the plurality of convex portions is 100% or less.

11. The decorative sheet according to claim 10, further comprising a support film layer on the decorative layer side.

12. The decorative sheet according to claim 11, wherein the support film layer is formed so as to fill concave portions on the decorative layer side.

13. The decorative sheet according to claim 11 or 12, further comprising an adhesive layer between the decorative layer and the support film layer.

14. The decorative sheet according to any one of claims 10 to 12, wherein a surface of the transparent resin film layer on a side opposite to the decorative layer is smooth.

15. The decorative sheet according to claim 12, further comprising an adhesive layer between the decorative layer and the support film layer.

16. The decorative sheet according to claim 11, wherein a surface of the transparent resin film layer on a side opposite to the decorative layer is smooth.

17. The decorative sheet according to claim 12, wherein a surface of the transparent resin film layer on a side opposite to the decorative layer is smooth.

18. A decorative resin molded article comprising:
a transparent resin film layer having an uneven shape on one surface thereof;

a decorative layer formed along the uneven shape of the transparent resin film layer; and a molded resin layer, wherein the uneven shape includes a plurality of convex portions having different heights and protruding from the transparent resin film layer side to the decorative layer side, and a ratio of the height h (μm) to the width w (μm) (h/w) in each of the plurality of convex portions is 100% or less.

* * * * *